US008928852B2

(12) United States Patent
Hirabayashi (10) Patent No.: US 8,928,852 B2
(45) Date of Patent: Jan. 6, 2015

(54) ELECTRO-OPTICAL MODULE, OPTICAL UNIT AND ELECTRONIC APPARATUS

(75) Inventor: Hidekazu Hirabayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 59 days.

(21) Appl. No.: 13/608,336

(22) Filed: Sep. 10, 2012

(65) Prior Publication Data

US 2013/0083268 A1    Apr. 4, 2013

(30) Foreign Application Priority Data

Sep. 29, 2011  (JP) ................. 2011-214089

(51) Int. Cl.
*G02F 1/1333* (2006.01)
*G03B 21/16* (2006.01)
*G03B 21/00* (2006.01)
*H04N 9/31* (2006.01)

(52) U.S. Cl.
CPC .......... *G02F 1/133385* (2013.01); *G03B 21/16* (2013.01); *G03B 21/006* (2013.01); *H04N 9/3105* (2013.01); *H04N 9/3144* (2013.01)
USPC ........................................... 349/161; 349/58

(58) Field of Classification Search
CPC .................... G02F 1/133385; G02F 1/133308; G02F 1/133382

USPC .................................................. 349/58, 161
See application file for complete search history.

(56) References Cited

U.S. PATENT DOCUMENTS

| 2002/0125803 | A1* | 9/2002 | Seki ......................... 313/47 |
| 2006/0077314 | A1* | 4/2006 | Li et al. ................... 349/58 |
| 2007/0097285 | A1* | 5/2007 | Choi ........................ 349/58 |
| 2010/0165239 | A1* | 7/2010 | Lee et al. ................. 349/58 |

FOREIGN PATENT DOCUMENTS

JP      2005-196027 A      7/2005

* cited by examiner

*Primary Examiner* — Nathanael R Briggs
(74) *Attorney, Agent, or Firm* — ALG Intellectual Property, LLC (57) ABSTRACT

An electro-optical panel is disposed in a panel housing portion formed inside of a frame. A heat radiation member made of metal is provided so as to overlap an exposed part from a first light transmitting plate on a second surface of a first substrate using the electro-optical panel, and the heat radiation member and the frame are fixed by an adhesive. A step portion is formed on a side surface of the panel housing portion, a surface facing the heat radiation member in a Z-axis direction is used as a first bonding surface, and a surface facing the heat radiation member in an X-axis direction (inner side surface of a plate-like portion) is used as a second bonding surface.

18 Claims, 8 Drawing Sheets

ELECTRO-OPTICAL MODULE, OPTICAL UNIT AND ELECTRONIC APPARATUS

BACKGROUND

1. Technical Field

The present invention relates to an electro-optical module which is used in an electronic apparatus such as a projection type display device and an electronic apparatus which includes the electro-optical module.

2. Related Art

When an image is displayed in an electronic apparatus such as a projection type display device, light which is modulated by an electro-optical panel such as a liquid crystal panel is used. The electro-optical panel has a configuration in which an electro-optical material layer is provided between a first translucent substrate and a second translucent substrate, and is used in a state of being fixed to a case such as a frame by an adhesive. For example, a configuration in which a liquid crystal panel (electro-optical panel) is fixed to a frame using a high thermal conducting mold resin as an adhesive is disclosed in JP-A-2005-196027.

However, as described in JP-A-2005-196027, when a liquid crystal panel is fixed to a frame, even when a high thermal conducting mold resin is used as an adhesive, thermal conductivity of the high thermal conducting mold resin is lower than that of metal. Thus, there is a problem that heat generated from the liquid crystal panel is not allowed to effectively escape.

The inventor proposes that a case which holds an electro-optical panel is formed with plural members, and a member of the plural members which comes in contact with the electro-optical panel is set as a member made of a high thermal conducting material such as metal. However, when the case which holds the electro-optical panel is formed with plural members, an adhesive leaks from between the plural members to the outside at the time of fixing the electro-optical panel to the case by the adhesive, which is a problem.

SUMMARY

An advantage of some aspects of the invention is that it provides an electro-optical module which holds an electro-optical panel by plural members including a member made of a high thermal conducting material such as metal, and in which an adhesive does not leak from between the plural members, even when the electro-optical panel is fixed by the adhesive, and an electronic apparatus which includes the electro-optical module.

According to an aspect of the invention, there is provided an electro-optical module including an electro-optical panel, a frame which has a frame portion that holds the electro-optical panel and is positioned on a side surface of the electro-optical panel and a heat radiation member which holds the electro-optical panel from an opposite side of the frame, and is disposed so as not to overlap an image display region of the electro-optical panel, in which the heat radiation member is bonded to a first bonding surface which faces a surface of the heat radiation member on a side in which the electro-optical panel is positioned in the frame portion, and a second bonding surface which faces a side surface of the heat radiation member in the frame portion by an adhesive inside of the frame.

In the electro-optical module, "translucent" means having translucency to light be modulated and light to be transmitted. In the electro-optical module, "hold" means a configuration in which the heat radiation member and the frame hold the electro-optical panel through other members in addition to a configuration in which the heat radiation member and the frame directly hold the electro-optical panel.

In the electro-optical module, the electro-optical panel is disposed inside of the frame, and the heat radiation member overlaps a surface of an opposite side of a side where the frame is positioned in the electro-optical panel. Therefore, since heat generated from the electro-optical panel is allowed to effectively escape through the heat radiation member, display quality deterioration caused by temperature increase of the electro-optical panel can be suppressed. The heat radiation member and the frame are fixed by the adhesive, and the electro-optical panel is held by the heat radiation member and the frame. The first bonding surface which faces the surface of the heat radiation member on the side in which the electro-optical panel is positioned and the second bonding surface which faces the side surface of the heat radiation member are provided in the frame portion of the frame, and the adhesive is provided on the first bonding surface and the second bonding surface. Therefore, since a gap between the heat radiation member and the first bonding surface, and a gap between the side surface of the heat radiation member and the second bonding surface are interposed between the inside and the outside of the frame, it is difficult for the adhesive to leak outside the frame. Since the heat radiation member and the frame are bonded over a wide area, bonding strength of the heat radiation member and the frame is large.

In the electro-optical module, the heat radiation member may be made of metal. In this configuration, since thermal conductivity of the heat radiation member is high, heat generated from the electro-optical panel is allowed to effectively escape through the heat radiation member.

In the electro-optical module, the heat radiation member may be bonded to a third bonding surface which faces the surface of the heat radiation member on the side in which the electro-optical panel is positioned on an outer side from the second bonding surface in the frame portion by the adhesive inside of the frame. In this configuration, since the heat radiation member and the frame are bonded over a wide area, bonding strength of the heat radiation member and the frame is large. Since the gap between the heat radiation member and the first bonding surface, the gap between the heat radiation member and the second bonding surface and a gap between the heat radiation member and the third bonding surface are interposed between the inside and the outside of the frame, it is difficult for the adhesive to leak outside the frame, which is advantageous.

In the electro-optical module, the electro-optical panel may have a first translucent substrate, a second translucent substrate which is disposed to face the first substrate of an opposite side of a side in which the heat radiation member is positioned and an electro-optical material layer which is provided between the first substrate and the second substrate. The heat radiation member may adopt a configuration of partially overlapping a surface of the first substrate opposite to the second substrate.

In the electro-optical module, it is preferable to provide a first light transmitting plate which overlaps at least the image display region in a state in which a surface of the electro-optical panel on the side where the heat radiation member is positioned is partially exposed and the heat radiation member may be provided so as to overlap at least a part of the exposed part from the first light transmitting plate of the first substrate. In this configuration, dust is not attached to the position close to the electro-optical material layer (first substrate). When an image generated from the electro-optical panel is projected, it is difficult for the image to be affected by dust. Even when the first light transmitting plate is provided, since the heat radiation member overlaps the exposed part from first light transmitting plate of the first substrate, heat generated from the electro-optical panel is allowed to escape through the heat radiation member.

In the electro-optical module, it is preferable that the first light transmitting plate be smaller than the first substrate in size, an end portion of the first light transmitting plate be positioned between an end portion of the first substrate and an end portion of the image display region in the entire periphery of the first light transmitting plate as seen from plan view, and the heat radiation member be provided so as to surround the entire periphery of the first light transmitting plate. In this configuration, since an area in which the exposed part from the first light transmitting plate of the first substrate overlaps the heat radiation member is large, heat generated from the electro-optical panel is allowed to effectively escape through the heat radiation member.

In the electro-optical module, the heat radiation member may have a plate-like part which overlaps not the image display region but the first light transmitting plate on the opposite side of the electro-optical panel. In this configuration, it is possible for the heat radiation member and the frame to hold the electro-optical panel and the first light transmitting plate.

In the electro-optical module, the plate-like part may form a parting portion. In this configuration, it is not necessary to separately provide a parting member in the opposite side of the second substrate of the first substrate.

In the electro-optical module, the end portions of the first light transmitting plate and the heat radiation member which face each other may be separated. In this configuration, even when temperature is decreased and the heat radiation member shrinks more than the first light transmitting plate, since the heat radiation member does not add a load to the first light transmitting plate or there is a small amount of load to add, it is possible to avoid that stress from the first light transmitting plate from being added to the electro-optical panel and the electro-optical panel is transformed.

In the electro-optical module, it is preferable to provide a second light transmitting plate which overlaps at least the image display region in a state in which a surface of the second substrate opposite to the first substrate is partially exposed. In this configuration, dust is not attached to the position close to the electro-optical material layer (second substrate). Accordingly, even when an image generated from the electro-optical panel is projected, it is difficult for the image to be affected by dust.

In the electro-optical module, the first substrate may be an element substrate which includes a pixel electrode and a switching element provided to correspond to the pixel electrode. When the electro-optical panel transmits light, more heat is generated from the first substrate (element substrate) in which the pixel electrode and the switching element are formed than from the second substrate. However, the heat generated from the first substrate is allowed to effectively escape through the heat radiation member by adopting this configuration.

In the electro-optical module, the electro-optical panel may be, for example, a liquid crystal panel including a liquid crystal layer as the electro-optical material layer.

The electro-optical module according to the aspect of the invention can be used in various electronic apparatus. When a projection type display device constitutes an electronic apparatus, the electronic apparatus includes a light source unit which emits light supplied to the electro-optical module, and a projecting optical system which projects light modulated by the electro-optical module.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to drawings. In the following description, a projection type display device using an electro-optical module including a transmission type electro-optical panel (transmission type liquid crystal panel) as a light valve is described as an electronic apparatus to which the invention is applied. In the drawings referred in the description below, a scale of each layer or each member varies in order to have recognizable size.

Configuration of Projection Type Display Device (Electronic Apparatus)

Figure 1A:
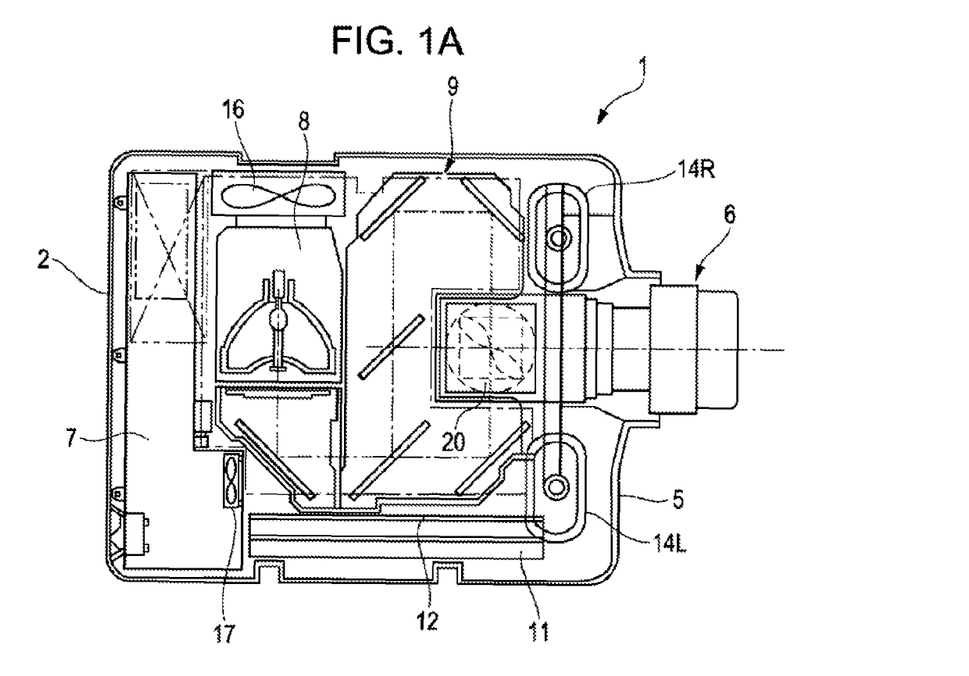
FIGS. 1A and 1B are explanatory views of a projection type display device as an example of an electronic apparatus to which the invention is applied.
Figure 1B:
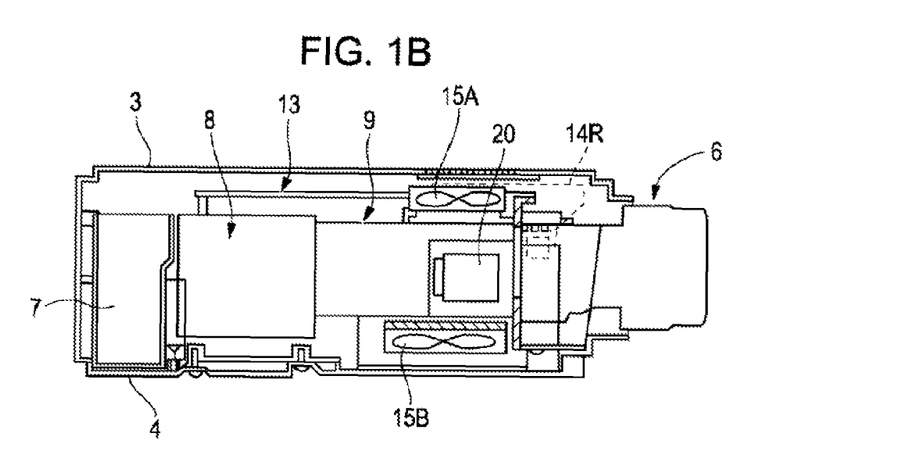
Figure 2:
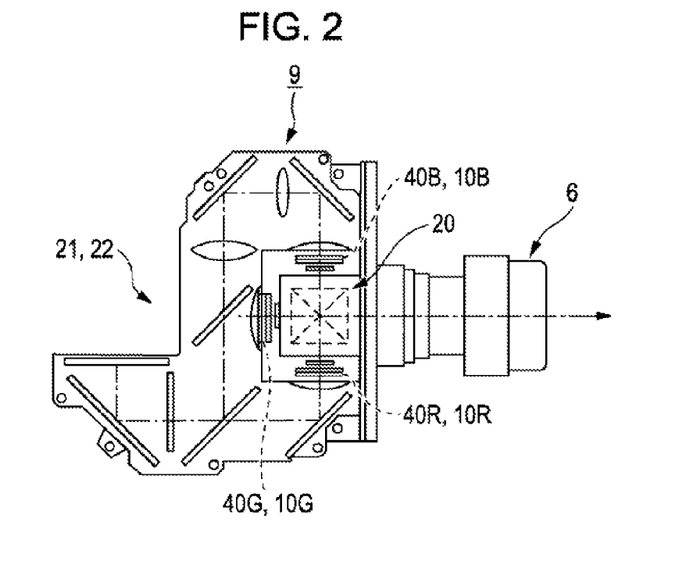
FIG. 2 is an explanatory view showing a configuration of an optical unit used in the projection type display device to which the invention is applied.

FIGS. 1A and 1B are explanatory views of a projection type display device as an example of an electronic apparatus to which the invention is applied. FIGS. 1A and 1B are explanatory views showing a plan configuration of main parts of the projection type display device, and explanatory views of the main parts as seen from a side. FIG. 2 is an explanatory view showing a configuration of an optical unit used in the projection type display device to which the invention is applied.

In a projection type display device 1 shown in FIGS. 1A and 1B, a power supply unit 7 is disposed in a rear end side of an exterior case 2, and a light source lamp unit 8 (light source unit) and an optical unit 9 are disposed in neighboring positions in a front side of the apparatus of the power supply unit 7. A base end side of a projection lens unit 6 is positioned in the center of a front side of the optical unit 9 in the exterior case 2. An interface substrate 11 on which an I/O interface circuit is mounted is disposed in the direction from front to rear of the apparatus, and a video substrate 12 on which a video signal processing circuit is mounted is disposed parallel with the interface substrate 11 in one side of the optical unit 9. A control substrate 13 for controlling apparatus driving is disposed above the light source lamp unit 8 and the optical unit 9, and both speakers 14R and 14L are disposed in each left corner and right corner of the front end of the apparatus.

Intake fans 15A and 15B for cooling the inside of the apparatus are disposed above and below the optical unit 9. An exhaust fan 16 is disposed on a side surface of the apparatus which is a rear surface of the light source lamp unit 8. Furthermore, a subsidiary cooling fan 17 to suck airflow for cooling from the intake fan 15A into the power supply unit 7 is disposed in a position facing the ends of the interface substrate 11 and the video substrate 12. Among the fans, the intake fan 15B functions as a cooling fan of the liquid crystal panel which is mainly described later.

In FIG. 2, each optical element which forms the optical unit 9 is supported by a prism unit 20 which forms color light synthesizing means, an upper light guide 21 and a lower light guide 22 made of metal such as Mg and Al. The upper light guide 21 and the lower light guide 22 are fixed to an upper case 3 and a lower case 4 by fixation screws.

Detailed Configuration of Optical Unit 9

Figure 3:
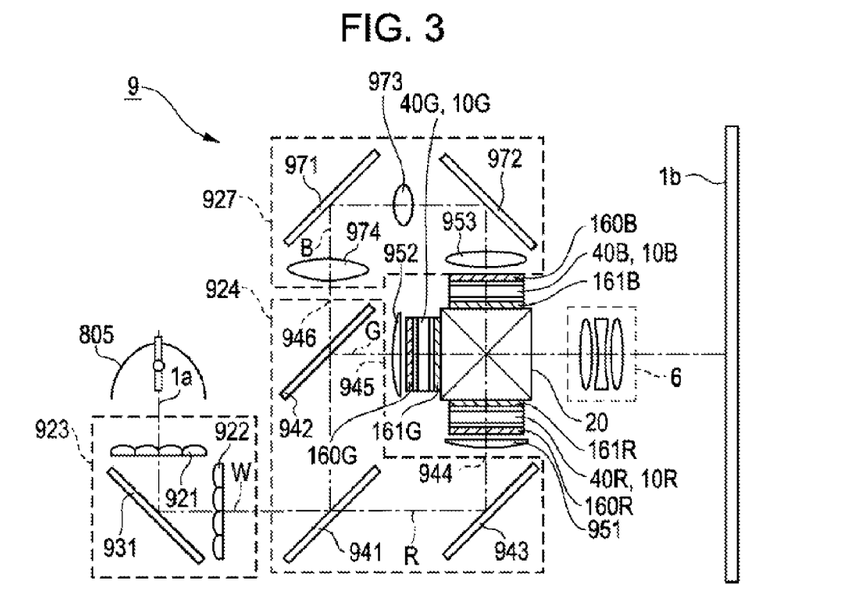
FIG. 3 is an explanatory view showing the detailed configuration of the optical unit used in the projection type display device to which the invention is applied.

FIG. 3 is an explanatory view showing the detailed configuration of the optical unit used in the projection type display device to which the invention is applied. As shown in FIG. 3, the optical unit 9 has a light source lamp 805, an illumination optical system 923 which has integrator lenses 921 and 922 which are uniform illumination optical elements, and a color light separation optical system 924 which separates light flux W emitted from the illumination optical system 923 to each light flux R, G, and B of red, green and blue. The optical unit 9 has three transmission type electro-optical panels 40(R), 40(G), and 40(B) as the electro-optical panels (light valves) which modulate each color light flux, the prism unit 20 as a color light synthesis optical system which synthesizes the modulated color light flux, and the projection lens unit 6 which enlarges and projects the synthesized light flux on a projection surface. A relay optical system 927 which guides the electro-optical panel 40(B) corresponding to the blue light flux B of each light flux separated by the color light separation optical system 924 is provided in the optical unit 9.

The illumination optical system 923 further has a reflection mirror 931 so as to bend an optical axis 1a of the emitted light from the light source lamp 805 at a right angle in the front direction of the apparatus. The integrator lenses 921 and 922 are disposed to interpose the reflection mirror 931 in a state of being orthogonal to each other in front and behind.

The color light separation optical system 924 is formed with a blue green reflection dichroic mirror 941, a green reflection dichroic mirror 942, and a reflection mirror 943. At first, in the blue green reflection dichroic mirror 941, the blue light flux B and the green light flux G included in the light flux W passed through the illumination optical system 923 are reflected at a right angle, and are directed to the green reflection dichroic mirror 942. The red light flux R is passed through the blue green reflection dichroic mirror 941, reflected at a right angle by the rear reflection mirror 943 and emitted from an emitting unit 944 of the red light flux to the color light synthesis optical system. Next, the green reflection dichroic mirror 942 reflects only the green light flux G among the blue and green light fluxes B and G reflected by the blue green reflection dichroic mirror 941, and the green light flux G is emitted from an emitting unit 945 of the green light flux to the color light synthesis optical system. The blue light flux B passed through the green reflection dichroic mirror 942 is emitted from an emitting unit 946 of the blue light flux to the relay optical system 927. This embodiment is set such that the distances from the emitting unit of the light flux of the illumination optical system 923 to the emitting units 944, 945 and 946 of each color light flux in the color light separation optical system 924 are substantially equal to each other.

Light collection lenses 951 and 952 are respectively disposed on the emitting sides of the emitting units 944 and 945 of the red and green light fluxes in the color light separation optical system 924. Thus, the red and green light fluxes emitted from each emitting units are input to the light collection lenses 951 and 952, and made parallel to each other.

The paralleled red and green light fluxes R and G are input to the electro-optical panels 40(R) and 40(G), and modulated after aligning polarization directions by polarization plates 160(R) and 160(G). Then, image information corresponding to each color light is added. That is, driving means (not shown) performs switching control on the electro-optical panels 40(R) and 40(G) based on an image signal corresponding to the image information, and then each color light passed through electro-optical panels is modulated. As the driving means, known means can be used as it is.

On the other hand, the blue light flux B is guided to the corresponding electro-optical panel 40(B) through the relay optical system 927 after arranging a polarization direction by a polarization plate 160(B) and modulated based on the image information in the same manner. The relay optical system 927 is provided with a light collection lens 974, an input side reflection mirror 971, an emitting side reflection mirror 972, a middle lens 973 disposed between the reflection mirrors, and a light collection lens 953 disposed on a front side of the electro-optical panel 40(B). As for the lengths of the light paths of each color light flux, that is, as for the distances from the light source lamp 805 to each liquid crystal panel, the blue light flux B has the longest light path, and the loss in the light amount of the blue light flux becomes the largest. However, the loss in the light amount can be suppressed by interposing the relay optical system 927.

Each color light flux modulated through each electro-optical panel 40(R), 40(G) and 40(B) is input to polarization plates 161(R), 161(G) and 161(B), and the light passes through the polarization plates, is input to the prism unit 20 (cross dichroic prism) and synthesized. The synthesized color image is enlarged and projected on a surface 1b to be projected such as a screen at a predetermined position through the projection lens unit 6 provided with a projection lens system.

Configuration of Electro-Optical Panel 40

Figure 4A:
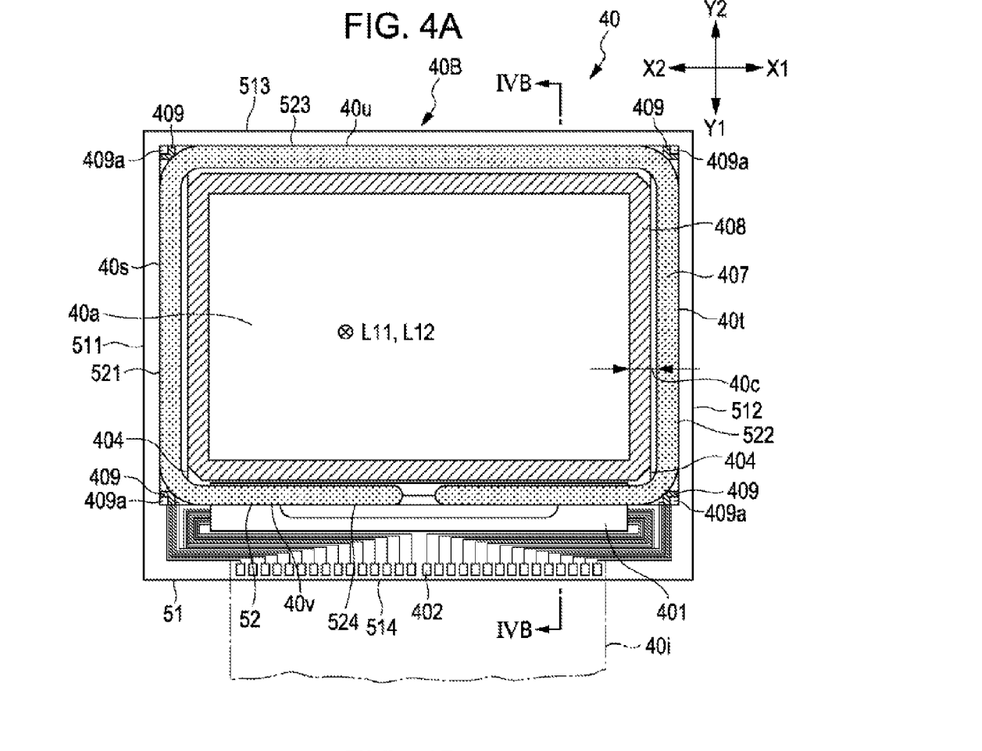
FIGS. 4A and 4B are explanatory views of an electro-optical panel used in an electro-optical module to which the invention is applied.
Figure 4B:
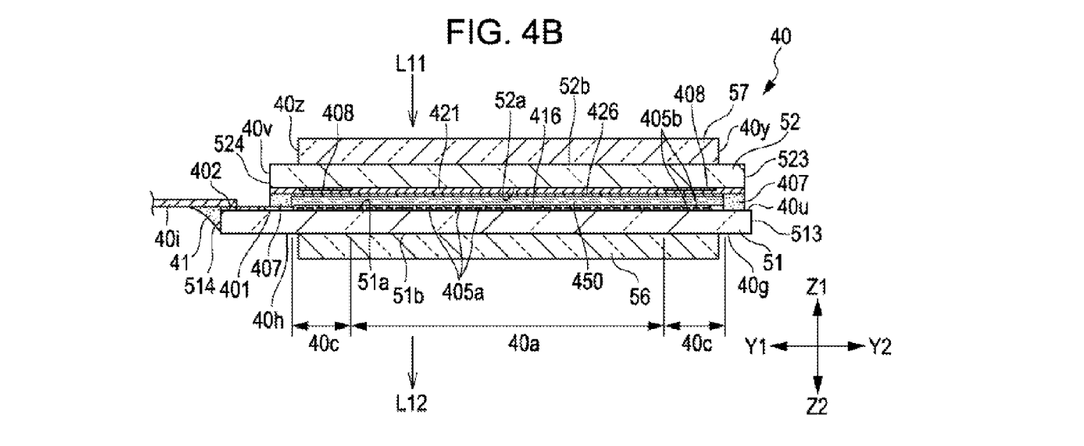

FIGS. 4A and 4B are explanatory views of an electro-optical panel 40 used in an electro-optical module to which the invention is applied, and the respective FIGS. 4A and 4B are a plan view of the electro-optical panel 40 seen from a second substrate (opposite substrate) together with each component, and a cross-sectional view cut along line IVB-IVB.

In FIGS. 4A and 4B and FIGS. 5 to 9 described later, a travelling direction of light source light is indicated by an arrow L11, a travelling direction of display light after modulating the light source light by the electro-optical panel 40 is indicated by an arrow L12, and the flow of cooling air supplied to the electro-optical panel 40 by the intake fan 15B shown in FIG. 1B or the like is indicated by an arrow A. In the description below, one side of a direction in which the electro-optical panel 40 and the electro-optical module cross in an in-plane direction is set as an X-axis direction, the other side is set as an Y-axis direction and a direction crossing the X-axis direction and the Y-axis direction is set as a Z-axis direction. In the referred drawings, one side of the X-axis direction (a side where a flexible wiring substrate 40i is provided) is expressed as an X1 side, and the other side is expressed as an X2 side. One side of the Y-axis direction is expressed as an Y1 side and the other side is expressed as an Y2 side. One side of the Z-axis direction (a side where the light source light is input) is expressed as a Z1 side and the other side (a side where the display light is emitted) is expressed as a Z2 side.

In the projection type display device 1 described with reference to FIGS. 1A to 3, when the electro-optical panels 40(R), 40(G) and 40(B) are mounted in the optical unit 9, each electro-optical panel 40(R), 40(G) and 40(B) is mounted as each electro-optical module 10(R), 10(G) and 10(B) to be described later. Here, the electro-optical panels 40(R), 40(G) and 40(B) have the same configuration, and the electro-optical modules 10(R), 10(G) and 10(B) in which the electro-optical panels 40(R), 40(G) and 40(B) are provided have the same configuration for red (R), green (G) and blue (B). Accordingly, in the following description, the electro-optical panels 40(R), 40(G) and 40(B) and the electro-optical modules 10(R), 10(G) and 10(B) will be described without (R), (G) and (B) showing the corresponding color.

As shown in FIGS. 4A and 4B, a first translucent substrate 51 (element substrate) and a second translucent substrate 52 (opposite substrate) are bonded by a seal material 407 with a predetermined gap in the electro-optical panel 40. The first substrate 51 and the second substrate 52 are made of quartz glass, heat resistance glass or the like, and the first substrate 51 and the second substrate 52 of this embodiment are made using quartz glass. In this embodiment, the electro-optical panel 40 is a liquid crystal panel, and a liquid crystal layer is held as an electro-optical material layer 450 in a region surrounded by the seal material 407 between the first substrate 51 and the second substrate 52. The seal material 407 is provided in a frame shape along an outer edge of the second substrate 52. The seal material 407 is a photo-curable adhesive, a heat-curable adhesive or a photo-curable and heat-curable adhesive, and is mixed with fiberglass or gap material such as glass beads to set the distance between both substrates to a predetermined value.

In this embodiment, the first substrate 51 is formed in a rectangular shape, and has end portions 511, 512, 513 and 514 formed with four sides. The second substrate 52 is also formed in a rectangular shape, and has end portions 521, 522, 523 and 524 formed with four sides as the first substrate 51. An image display region 40a which emits the modulated light is provided as a rectangular region in the substantially center of the electro-optical panel 40. According to the corresponding shape, the seal material 407 is also provided in a substantially rectangular shape, and a peripheral region 40c of a rectangular frame shape is provided between an inner peripheral edge of the seal material 407 and an outer peripheral edge of the image display region 40a.

In this embodiment, the first substrate 51 is larger than the second substrate 52 in size and the four end portions 511, 512, 513 and 514 of the first substrate 51 are respectively more outwardly protruded than the end portions 521, 522, 523 and 524 of the second substrate 52. Therefore, step portions 40s, 40t, 40u and 40v are formed by the first substrate 51 and the end portions 521, 522, 523 and 524 of the second substrate 52 around the second substrate 52, and the first substrate 51 is exposed from the second substrate 52 in the step portions 40s, 40t, 40u and 40v. The end portion 514 of the four end portions 511, 512, 513 and 514 positioned on one side Y1 of the Y-axis direction is more considerably protruded than other end portions 511, 512 and 513 from the end portion 524 of the second substrate 52. A data line driving circuit 401 and plural terminals 402 are formed in the first substrate 51 along the end portion 514. A scanning line driving circuit 404 is formed on the first substrate 51 along the end portions 511 and 512. The terminals 402 are connected to the flexible wiring substrate 40i, and various kinds of potential and various kinds of signals are input to the first substrate 51 through the flexible wiring substrate 40i. An adhesive 41 for reinforcement is applied to the first substrate 51 so that the flexible wiring substrate 40i extends over the end portion 514.

Pixels provided with translucent pixel electrodes 405a and pixel transistors (switching elements, not shown) corresponding to the pixel electrodes 405a are formed in a matrix shape in the image display region 40a on a first surface 51a which faces the second substrate 52 in the first surface 51a and a second surface 51b of the first substrate 51. An oriented film 416 is formed on an upper layer side of the pixel electrodes 405a. Dummy pixel electrodes 405b which are formed with the pixel electrodes 405a at the same time are formed in the peripheral region 40c on the first surface 51a of the first substrate 51. The dummy pixel electrodes 405b adopt a configuration of electrical connection to dummy pixel transistors, a configuration of direct and electrical connection to wiring without the dummy pixel transistors, or a configuration of a floating state in which potential is not applied.

A translucent common electrode 421 is formed on a first surface 52a which faces the first substrate 51 in the first surface 52a and a second surface 52b of second substrate 52, and an oriented film 426 is formed on an upper layer of the common electrode 421. The common electrode 421 is formed by extending over the plural pixels as an approximately whole surface of the second substrate 52 or plural band electrodes. In this embodiment, the common electrode 421 is formed as the approximately whole surface of the second substrate 52. A light shield layer 408 is formed on a lower layer side of the common electrode 421 on the first surface 52a of the second substrate 52. In this embodiment, the light shield layer 408 extends along the outer peripheral edge of the image display region 40a and is formed in a frame shape. The image display region 40a is defined by an inner edge of the light shield layer 408. An outer peripheral edge of the light shield layer 408 is in the position with a gap with respect to the inner peripheral edge of the seal material 407, and the light shield layer 408 and the seal material 407 do not overlap each other. In the second substrate 52, a light shield layer, which is formed with the light shield layer 408 at the same time, is formed as a black matrix or black stripe in a region which overlaps a region interposed by the neighboring pixel electrodes 405a.

An inter-substrate conduction electrode 409 is formed to obtain electrical conduction between the first substrate 51 and the second substrate 52 in a region overlapping a corner part of the second substrate 52 of the first substrate 51 on an outer side from the seal material 407. An inter-substrate conduction material 409a which includes conduction particles is disposed between the inter-substrate conduction electrode 409 and the second substrate 52, and the common electrode 421 of the second substrate 52 is electrically connected to the first substrate 51 through the inter-substrate conduction material 409a and the inter-substrate conduction electrode 409. Thus, common potential is applied to the common electrode 421 from the first substrate 51. The seal material 407 is provided with approximately the same width dimension along the outer peripheral edge of the second substrate 52. However, the seal material 407 is provided so as to pass inside avoiding the inter-substrate conduction electrode 409 in the region overlapping the corner part of the second substrate 52.

In the electro-optical panel 40 with this configuration, since the pixel electrode 405a and the common electrode 421 are formed with a translucent conductive film such as an ITO film in the embodiment, the electro-optical panel 40 is a transmission type liquid crystal panel. In the case of the transmission type liquid crystal panel (electro-optical panel 40), light input from one substrate of the first substrate 51 and the second substrate 52 is modulated while transmitting the other substrate and being emitted. In the embodiment, light input from the second substrate 52 (indicated by the arrow L11) transmits in the first substrate 51 and is emitted as modulated light (indicated by the arrow L12). For this reason, the second substrate 52 is disposed in one side Z1 of the Z-axis direction and the first substrate 51 is disposed in the other side Z2 of the Z-axis direction. When the common electrode 421 is formed by the translucent conductive film and the pixel electrode 405a is formed by a reflective conductive film, it is possible to form a reflection type liquid crystal panel. In the case of the reflection type liquid crystal panel, the light input from the second substrate 52 is modulated while being reflected by the first substrate 51 and emitted. Since the electro-optical panel 40 of the embodiment is used as a light valve in the above-described projection type display device (liquid crystal projector), a color filter is not formed. However, when the electro-optical panel 40 is used as a direct-view-type color display device of an electronic apparatus such as a mobile computer and a mobile phone, a color filter is formed in the second substrate 52.

Overall Configuration of Electro-optical Module 10

Figure 5:
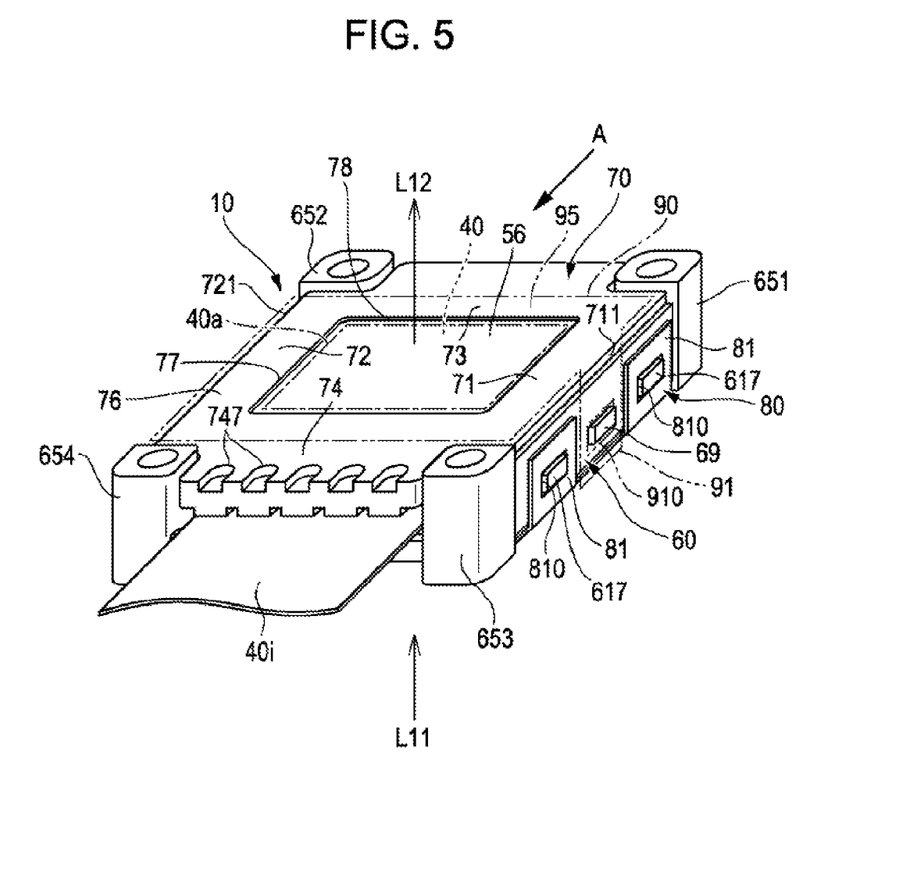
FIG. 5 is a perspective view of an electro-optical module used in the projection type display device to which the invention is applied as seen from a light emitting side.
Figures 6A, 6B:
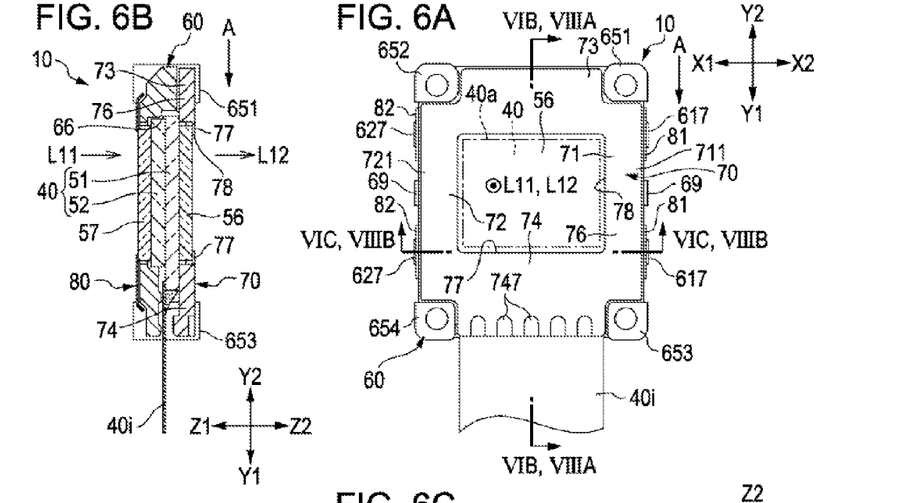
FIGS. 6A to 6D are explanatory views of the electro-optical module used in the projection type display device to which the invention is applied.
Figure 6C:
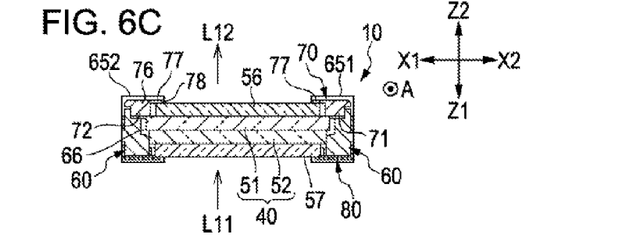
Figure 6D:
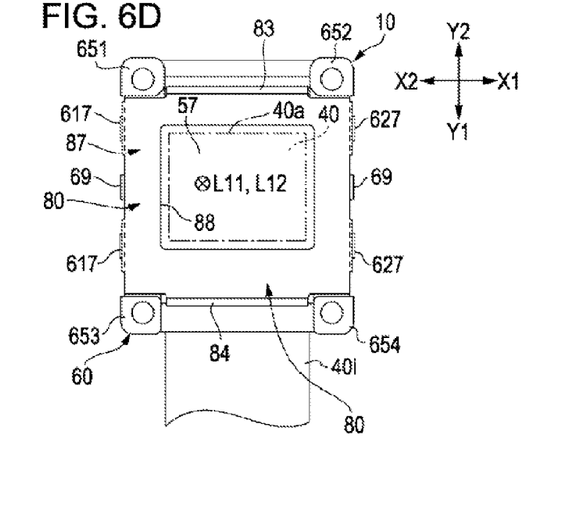
Figure 7:
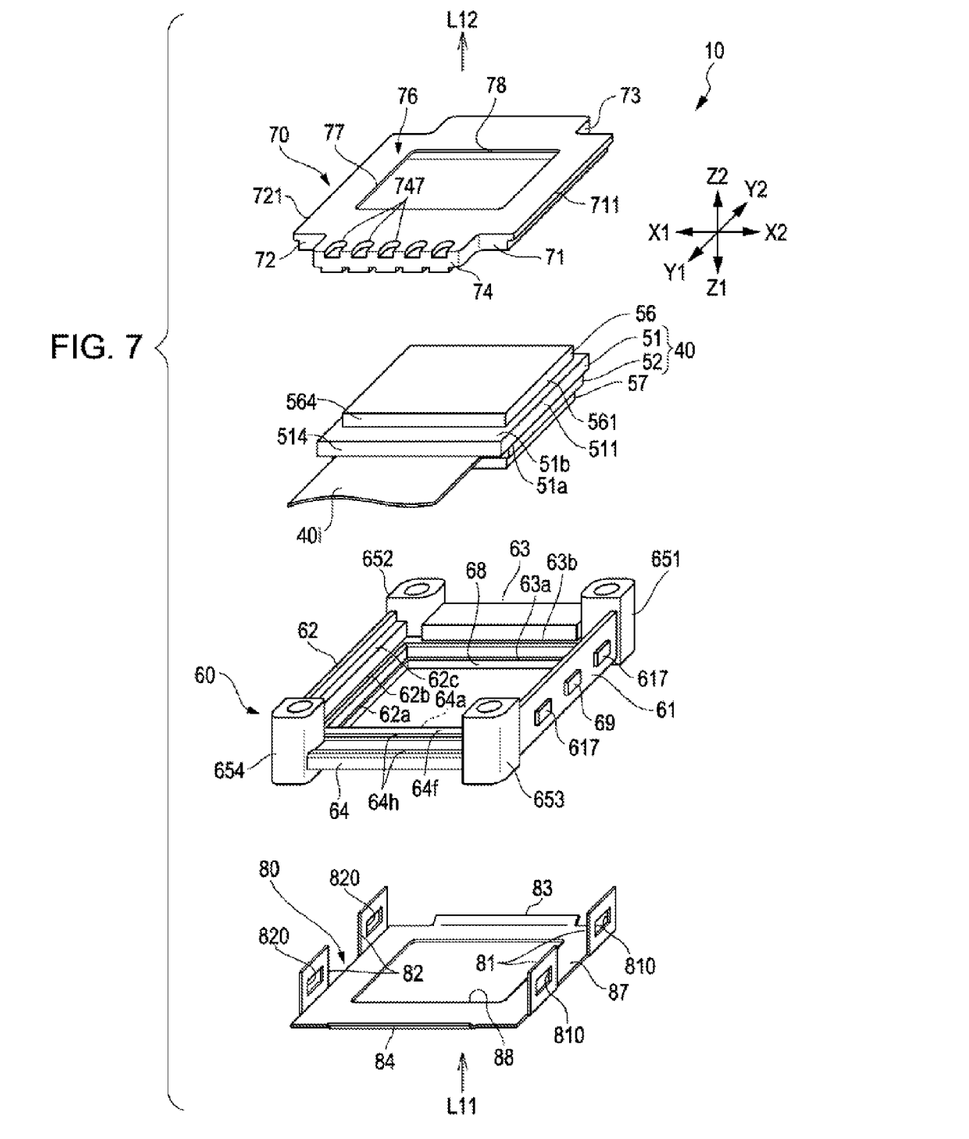
FIG. 7 is an exploded perspective view of a state in which the electro-optical module used in the projection type display device to which the invention is applied is exploded as seen from the light emitting side.

FIG. 5 is a perspective view of the electro-optical module used in the projection type display device 1 to which the invention is applied as seen from a light emitting side. FIGS. 6A to 6D are explanatory views of the electro-optical module used in the projection type display device 1 to which the invention is applied, and FIGS. 6A to 6D respectively a plan view of the electro-optical module as seen from the light emitting side, a cross-sectional view cut along line VIB-VIB, a cross-sectional view cut along line VIC-VIC, and a bottom view as seen from the light emitting side. FIG. 7 is an exploded perspective view of a state in which the electro-optical module used in the projection type display device 1 to which the invention is applied is exploded as seen from the light emitting side.

Figure 8A:
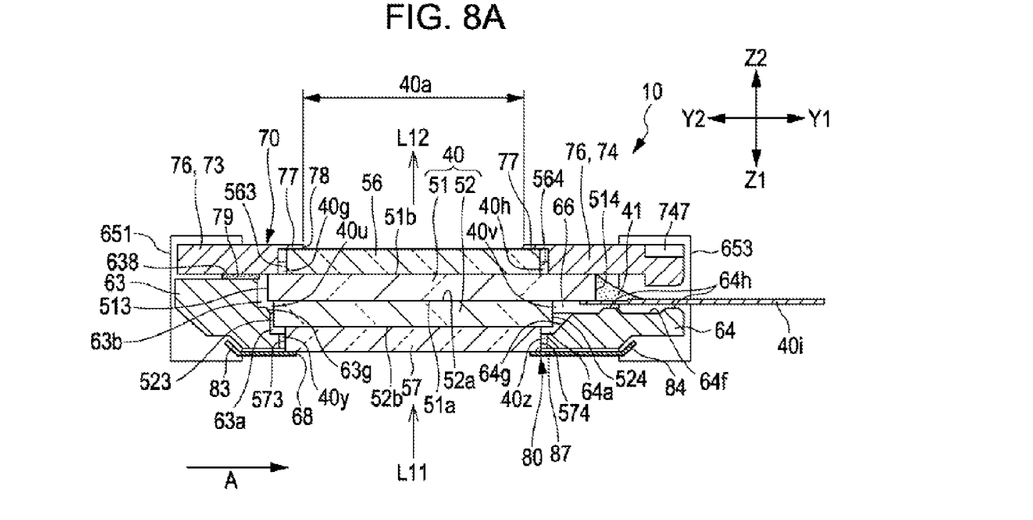
FIGS. 8A and 8B are enlarged explanatory views of a cross-sectional configuration of the electro-optical module used in the projection type display device to which the invention is applied.
Figure 8B:
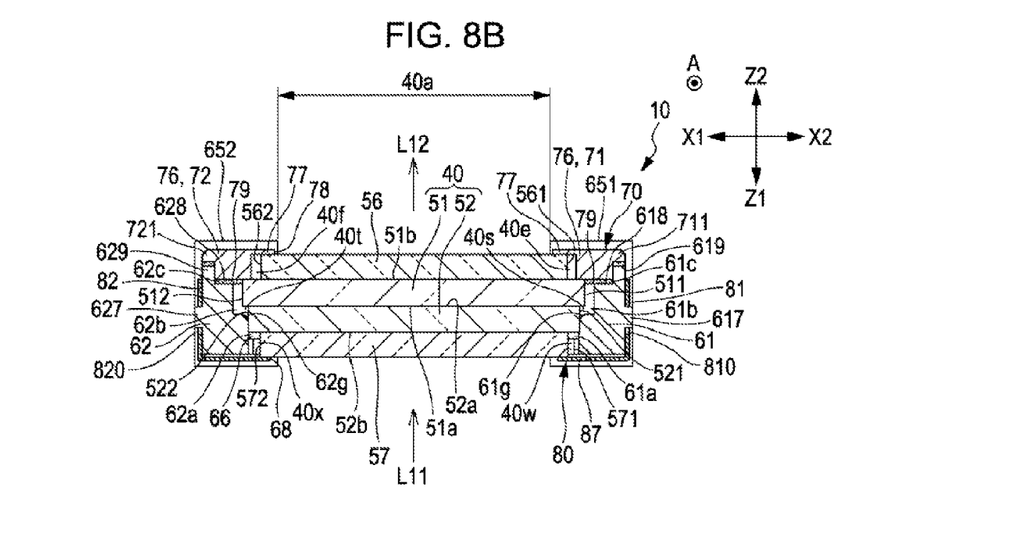
Figure 9:
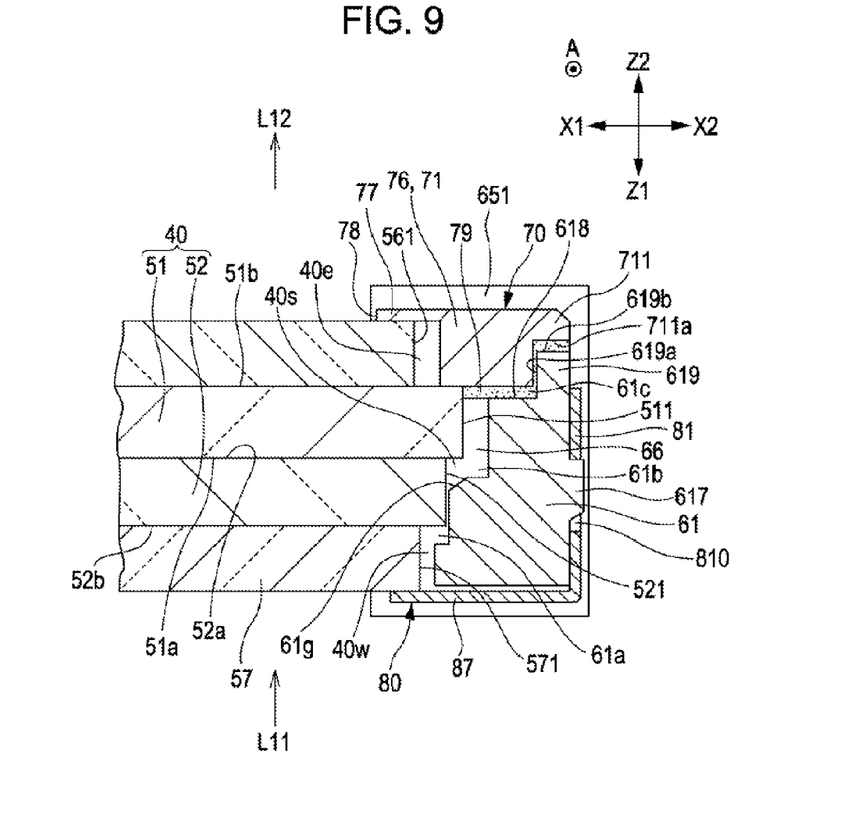
FIG. 9 is an enlarged explanatory view showing a part in which an adhesive shown in FIGS. 8A and 8B is provided.

FIGS. 8A and 8B are enlarged explanatory views of a cross-sectional configuration of the electro-optical module used in the projection type display device 1 to which the invention is applied. FIGS. 8A and 8B are an enlarged explanatory view of the cross section cut along line VIIIA-VIIIA, and an enlarged explanatory view of the cross section cut along line VIIIB-VIIIB. FIG. 9 is an enlarged explanatory view showing a part in which an adhesive shown in FIGS. 8A and 8B is provided, and corresponds to a cross-sectional view of the end portion of the other side X2 of the X-axis direction of FIG. 8B.

When the electro-optical panel 40 described with referring to FIGS. 4A and 4B is mounted in the projection type display device 1 and the optical unit 9 described with referring to FIGS. 1A to 3, the electro-optical module 10 in which the electro-optical panel 40 is held by a frame 60 is provided for reinforcement as described in FIGS. 5 to 9. As the electro-optical module 10 of the embodiment, a heat radiation member 70 and an input side parting member 80 described later are used in addition to the electro-optical panel 40 and the frame 60. Hereafter, a detailed configuration of the electro-optical module 10 will be described with mainly referring to FIGS. 8A to 9.

Configurations of First Light Transmitting Plate 56 and Second Light Transmitting Plate 57

As shown in FIGS. 8A and 8B or like, when the electro-optical module 10 is formed using the electro-optical panel 40 in the embodiment, a first light transmitting plate 56 is bonded on the second surface 51b of the first substrate 51 (outer surface/the surface of the first substrate 51 opposite to the second substrate 52) by an adhesive or the like, and a second light transmitting plate 57 is bonded on the second surface 52b of the second substrate 52 (outer surface/the surface of the second substrate 52 opposite to the first substrate 51) by an adhesive or the like. The first light transmitting plate 56 and the second light transmitting plate 57 are respectively provided as dustproof glass, and prevent dust or the like from attaching to the outer surface of the first substrate 51 (second surface 51b) and the outer surface of the second substrate 52 (second surface 52b). Thus, even when dust is attached to the electro-optical panel 40, dust is separated from the electro-optical material layer 450. Accordingly, it is possible to suppress dust from showing as a shadow on an image projected by the projection type display device 1 described with reference to FIGS. 1A and 1B. As the first light transmitting plate 56 and the second light transmitting plate 57, quartz glass, heat resistance glass or like are used, and quartz glass which is 1.1 to 1.2 mm in thickness is used as the first light transmitting plate 56 and the second light transmitting plate 57 like the first substrate 51 and the second substrate 52 in the embodiment.

The first light transmitting plate 56 is provided so that the electro-optical panel 40 overlaps at least the image display region 40a in a state in which the second surface 51b of the first substrate 51 is partially exposed. More specifically, the first light transmitting plate 56 is a rectangular shape smaller than the first substrate 51, and the end portions 561, 562, 563 and 564 of the first light transmitting plate 56 are respectively more inwardly positioned than the end portions 511, 512, 513 and 514 of the first substrate 51 in the entire periphery of the first light transmitting plate 56 and are overlapped between the end portions 511, 512, 513 and 514 of the first substrate 51 and the end portions of the image display region 40a. Therefore, the step portions 40e, 40f, 40g and 40h are formed by the end portions 561, 562, 563 and 564 of the first light transmitting plate 56 and the second surface 51b of the first substrate 51 around the first light transmitting plate 56.

The second light transmitting plate 57 is provided so that the electro-optical panel 40 overlaps at least the image display region 40a in a state in which the second surface 52b of the second substrate 52 is partially exposed. More specifically, the second light transmitting plate 57 is a rectangular shape approximately the same as the first light transmitting plate 56 in size, and is smaller than the second substrate 52 in size. Due to this, end portions 571, 572, 573 and 574 of the second light transmitting plate 57 are respectively more inwardly positioned than the end portions 521, 522, 523 and 524 of the second substrate 52 in the entire periphery of the second light transmitting plate 57, and are overlapped between the end portions 521, 522, 523 and 524 of the second substrate 52 and the end portions of the image display region 40a. Therefore, step portions 40w, 40x, 40y and 40z are formed by the end portions 571, 572, 573 and 574 of the second light transmitting plate 57 and the second surface 52b of the second substrate 52 around the second light transmitting plate 57.

Configuration of Frame 60

In the embodiment, the frame 60 is a resin member or a metal member of rectangular frame shape which has a rectangular opening portion 68 (refer to FIG. 7) in the center, and has four frame portions 61, 62, 63 and 64 which surround the periphery of the electro-optical panel 40. In the four frame portions 61, 62, 63 and 64, connecting portions (corner parts) of the neighboring frame portions are prismatic connecting portions 651, 652, 653 and 654. In the embodiment, the frame 60 is a metal member. When the input side parting member 80 described later is attached to the frame 60, a panel housing portion 66 is formed inside of the frame 60, and the panel housing portion 66 has a bottom portion made of the parting member 80.

In the frame 60, inside surfaces of the frame portions 61, 62, 63 and 64 have a multilevel structure corresponding to the end portion shape in the state in which the first light transmitting plate 56 and the second light transmitting plate 57 are bonded to the electro-optical panel 40. More specifically, as shown in FIGS. 8B and 9, three step portions 61a, 61b and 61c are formed on the inside surface of the frame portion 61 positioned the other side X2 of the X-axis direction on a side surface of the panel housing portion 66 along the Z-axis direction in which the second light transmitting plate 57, the second substrate 52, the first substrate 51 and the first light transmitting plate 56 are disposed. The step portion 40w of the electro-optical panel 40 side is confronted with the step portion 61a of the frame portion 61, the step portion 40s of the electro-optical panel 40 side is confronted with the step portion 61b of the frame portion 61, and the step portion 40e of the electro-optical panel 40 side is confronted with the step portion 61c of the frame portion 61. Therefore, the end portion 571 of the second light transmitting plate 57 is separated from the inside surface of the frame portion 61 with a gap, the end portion 521 of the second substrate 52 is separated from the inside surface of the frame portion 61 with an extremely narrow gap, and the end portion 511 of the first substrate 51 is separated from the inside surface of the frame portion 61 with a gap. The end portion 561 of the first light transmitting plate 56 is separated from the inside surface of the frame portion 61 with a wide enough space. The separation dimensions have a following magnitude relationship of the separation dimension of the end portion 521 of the second substrate 52 and the inside surface of the frame portion 61<the separation dimension of the end portion 571 of the second light transmitting plate 57 and the inside surface of the frame portion 61<the separation dimension of the end portion 511 of the first substrate 51 and the inside surface of the frame portion 61<<the separation dimension of the end portion 561 of the first light transmitting plate 56 and the inside surface of the frame portion 61.

As shown in FIG. 8B, three step portions 62a, 62b and 62c are formed on an inside surface of the frame portion 62 positioned on one side X1 of the X-axis direction along the Z-axis direction in which the second light transmitting plate 57, the second substrate 52, the first substrate 51 and the first light transmitting plate 56 are disposed, as the inside surface of the frame portion 61. Here, the step portion 40x of the electro-optical panel 40 side is confronted with the step portion 62a of the frame portion 62, the step portion 40t of the electro-optical panel 40 side is confronted with the step portion 62b of the frame portion 62, and the step portion 40f of the electro-optical panel 40 side is confronted with the step portion 62c of the frame portion 62. Therefore, the end portion 572 of the second light transmitting plate 57 is separated from the inside surface of the frame portion 62 with a gap, the end portion 522 of the second substrate 52 is separated from the inside surface of the frame portion 62 with an extremely narrow gap, and the end portion 512 of the first substrate 51 is separated from the inside surface of the frame portion 62 with a gap. The end portion 562 of the first light transmitting plate 56 is separated from the inside surface of the frame portion 62 with a wide enough space. The separation dimensions have a following magnitude relationship of the separation dimension of the end portion 522 of the second substrate 52 and the inside surface of the frame portion 62<the separation dimension of the end portion 572 of the second light transmitting plate 57 and the inside surface of the frame portion 62<the separation dimension of the end portion 512 of the first substrate 51 and the inside surface of the frame portion 62<<the separation dimension of the end portion 562 of the first light transmitting plate 56 and the inside surface of the frame portion 62.

As shown in FIG. 8A, only two step portions 63a and 63b are formed on an inside surface of the frame portion 63 positioned in the other side Y2 of the Y-axis direction along the Z-axis direction in which the second light transmitting plate 57, the second substrate 52, the first substrate 51 and the first light transmitting plate 56 are disposed, unlike the inside surfaces of the frame portions 61 and 62. Here, the step portion 40y of the electro-optical panel 40 side is confronted with the step portion 63a of the frame portion 63 and the step portion 40u of the electro-optical panel 40 side is confronted with the step portion 63b of the frame portion 63. Therefore, the end portion 573 of the second light transmitting plate 57 is separated from the inside surface of the frame portion 63 with a gap, the end portion 523 of the second substrate 52 is separated from the inside surface of the frame portion 63 with an extremely narrow gap, and the end portion 513 of the first substrate 51 is separated from the inside surface of the frame portion 63 with a gap. The separation dimensions have a following magnitude relationship of the separation dimension of the end portion 523 of the second substrate 52 and the inside surface of the frame portion 63<the separation dimension of the end portion 573 of the second light transmitting plate 57 and the inside surface of the frame portion 63<the separation dimension of the end portion 513 of the first substrate 51 and the inside surface of the frame portion 63. Since the frame portion 63 has a small dimension in the Y-axis direction in comparison with the frame portions 61 and 62, the frame portion 63 does not reach the outer side of the end portion 563 of the first light transmitting plate 56.

Only one step portion 64a is formed on an inside surface of the frame portion 64 positioned in one side Y1 of the Y-axis direction unlike the inside surfaces of the frame portions 61, 62 and 63. The frame portion 64 has a plate-like portion 64f which spreads in the in-plane direction of the electro-optical panel 40 in the outer side from the step portion 64a, and a tapered surface 64g between the step portion 64a and the plate-like portion 64f. Thus, the flexible wiring substrate 40i can be pulled out of the frame 60 so as to extend along the in-plane direction of the electro-optical panel 40. Two protrusion portions 64h are formed on a surface positioned on the flexible wiring substrate 40i side of the plate-like portion 64f. Therefore, displacement of the flexible wiring substrate 40i to the plate-like portion 64f can be limited by the protrusion portions 64h. The step portion 40z of the electro-optical panel 40 side is confronted with the step portion 64a of the frame portion 64. Therefore, the end portion 574 of the second light transmitting plate 57 is separated from the inside surface of the frame portion 64 with a gap.

When the electro-optical module 10 is manufactured using the frame 60 with such configuration, the input side parting member 80 described later is attached to the frame 60, and the panel housing portion 66 is formed inside of the frame 60 to house the electro-optical panel 40 inside of the panel housing portion 66. More specifically, after the first light transmitting plate 56 and the second light transmitting plate 57 are bonded to the electro-optical panel 40, the electro-optical panel 40 is provided inside of the frame 60 (panel housing portion 66) so as to precede the second light transmitting plate 57 side from the side in which display light is emitted (the other side Z2 of the Z-axis direction) in the frame 60. At this time, the end portions 521, 522, 523 and 524 of the second substrate 52 is more outwardly protruded than the second light transmitting plate 57. In the embodiment, the corner part between the step portion 61a and the step portion 61b is set as a tapered surface 61g which is slantingly directed to the other side Z2 of the Z-axis direction, and the end portion 521 of the second substrate 52 is set to be guided inside of the tapered surface 61g in the frame portion 61. In the frame portion 62, as the frame portion 61, the corner part between the step portion 62a and the step portion 62b is set as a tapered surface 62g which is slantingly directed to the other side Z2 of the Z-axis direction, and the end portion 522 of the second substrate 52 is set to be guided inside of the tapered surface 62g. The corner part between the step portion 63a and the step portion 63b is set as a tapered surface 63g which is slantingly directed to the other side Z2 of the Z-axis direction, and the end portion 523 of the second substrate 52 is set to be guided inside of the tapered surface 63g in the frame portion 63 as the frame portion 61. In the frame portion 64, the corner part between the step portion 64a and the plate-like portion 64f is set as a tapered surface 64g which is slantingly directed to the other side Z2 of the Z-axis direction, and the end portion 524 of the second substrate 52 is set to be guided inside of the tapered surface 64g.

Configuration of Input Side Parting Member 80

The plate-like parting member 80 which is formed with a metal plate or a resin plate is provided to overlap the frame 60 on the light input side (one side Z1 of the Z-axis direction). In the embodiment, the parting member 80 is made of metal. The parting member 80 has a rectangular end plate portion 87 which overlaps the frame 60 in the light input side, and the end plate portion 87 has an opening portion 88 which overlaps the opening portion 68 of the frame 60. The opening portion 88 is smaller than the opening portion 68 of the frame 60, and the end plate portion 87 is inwardly protruded inside of the opening portion 68 in the entire periphery of the opening portion 68. For this reason, the end plate portion 87 of the parting member 80 functions as a parting portion which limits a range in which light is input to the electro-optical panel 40.

The parting member 80 has side plate portions 81, 82, 83 and 84 which extend from the outer edge of the plate portion 87. The side plate portion 83 of the side plate portions 81, 82, 83 and 84 which is positioned on the other side Y2 of the Y-axis direction extends so as to overlap a surface of the frame portion 63 on one side Z1 of the Z-axis direction and a tip portion of the side plate portion 83 is slantingly bent along the shape of the frame portion 63. The side plate portion 84 which is positioned on one side Y1 of the Y-axis direction extends so as to overlap a surface of the frame portion 64 on one side Z1 of the Z-axis direction, and a tip portion of the side plate portion 84 is slantingly bent along the shape of the frame portion 64.

The side plate portion 81 which is positioned on the other side X2 of the X-axis direction is bent from an end portion of the end plate portion 87 to the other side Z2 of the Z-axis direction at about a right angle so as to overlap an outside surface of the frame portion 61. In the embodiment, the side plate portion 81 is provided at two places which are separated in the Y-axis direction, and an engaging hole 810 is formed in each of the two side plate portions 81. Meanwhile, a protrusion portion 617 which fits each of two engaging holes 810 is formed on the outside surface of the frame portion 61 in the frame 60. The side plate portion 82 which is positioned on one side X1 of the X-axis direction is bent from an end portion of the end plate portion 87 to the other side Z2 of the Z-axis direction at about a right angle so as to overlaps an outside surface of the frame portion 62. In the embodiment, the side plate portion 82 is provided at two places which are separated in the Y-axis direction, and an engaging hole 820 is formed in each of two side plate portions 82. Meanwhile, a protrusion portion 627 which fits each of two engaging holes 820 is formed on the outside surface of the frame portion 62 in the frame 60. Accordingly, the parting member 80 is connected to the frame 60 such that the side plate portions 81 and 82 which are provided so as to interpose the frame 60 therebetween are engaged with the protrusion portions 617 and 627 of the frame 60, and is integrated with the frame 60. As a result, the panel housing portion 66 which has the end plate portion 87 of the parting member 80 as a bottom portion is formed inside of the frame 60, and the electro-optical panel 40 to which the first light transmitting plate 56 and the second light transmitting plate 57 are bonded is accommodated in the panel housing portion 66.

Protrusion portions 69 are formed at the positions between the protrusion portions 617 and 627 on the outside surfaces of the frame portions 61 and 62 in the frame 60, and the protrusion portion 69 is engaged with a temporarily fastening tool 90 described later, when the electro-optical module 10 is assembled.

In the embodiment, although the frame-shaped end plate portion 87 of the parting member 80 is used as an input side parting, the light shield layer is provided in a region of the second light transmitting plate 57 which overlaps the end plate portion 87, and the input side parting may be performed by the light shield layer and the parting member 80.

Configuration of Heat Radiation Member 70

As described above, the first light transmitting plate 56 is a rectangular shape smaller than the first substrate 51 in the embodiment, and the second surface 51b of the first substrate 51 is exposed from the first light transmitting plate 56 over the entire periphery along the end portions 511, 512, 513 and 514. The heat radiation member 70 is provided so that the second surface 51b of the first substrate 51 overlaps at least a part of the exposed part from the first light transmitting plate 56 on the other side Z2 of the Z-axis direction, and the heat radiation member 70 is made of a material having a higher thermal conductivity than those of the first light transmitting plate 56 and the electro-optical panel 40 (the first substrate 51 and the second substrate 52). More specifically, the heat radiation member 70 is made of metal such as aluminum or copper. In the embodiment, as the heat radiation member 70, a forged product of aluminum is used and a blacking process is performed on the surface of the heat radiation member 70. The heat radiation member 70 has a rectangular frame part 76 which overlaps the outer peripheral region of the second surface 51b over the entire periphery of the first substrate 51, and the rectangular frame part 76 is formed with four frame portions 71, 72, 73 and 74.

The heat radiation member 70 has an inner peripheral thin plate portion 77 (plate-like portion) which is inwardly protruded from an inner edge of the rectangular frame part 76 and the inner peripheral thin plate portion 77 overlaps a surface of the first light transmitting plate 56 opposite to the side in which the electro-optical panel 40 is positioned. An opening portion 78 is formed in a region in which the inner peripheral thin plate portion 77 overlaps the image display region 40a of the electro-optical panel 40 and the inner peripheral thin plate portion 77 functions as an emitting side parting portion. In the embodiment, the parting portion (inner peripheral thin plate portion 77) is integrated with the heat radiation member 70.

An outer peripheral thin plate portion 711 is formed in the heat radiation member 70 from the frame portion 71 of the rectangular frame part 76 to the other side X2 of the X-axis direction. An outer peripheral thin plate portion 721 is formed in the heat radiation member 70 from the frame portion 72 of the rectangular frame part 76 to one side X1 of the X-axis direction. The dimension of the frame portion 71 in the X-axis direction (width dimension) is smaller than the separation distance between the end portion 561 of the first light transmitting plate 56 and the frame portion 61 of the frame 60 in the X-axis direction, and the dimension of the frame portion 72 in the X-axis direction (width dimension) is smaller than the separation distance between the end portion 562 of the first light transmitting plate 56 and the frame portion 62 of the frame 60 in the X-axis direction.

The dimension of the frame portions 73 and 74 in the Y-axis direction is larger than the dimension of the frame portions 71 and 72 in the X-axis direction. Unlike the frame portions 71 and 72, the outer peripheral thin plate portion is not formed in the frame portions 73 and 74, and the frame portions 73 and 74 are formed with a dimension of an approximately fixed thickness (dimension of the Z-axis direction). The frame portions 63 and 64 of the frame 60 have a small dimension in the Z-axis direction. For this reason, the frame portion 63 of the frame 60 is not present at the position where the end portion 563 of the first light transmitting plate 56 faces the other side Y2 of the Y-axis direction and the frame portion 64 of the frame 60 is not present at the position where the end portion 564 of the first light transmitting plate 56 faces one side Y1 of the Y-axis direction.

Accordingly, after the electro-optical panel 40 to which the first light transmitting plate 56 and the second light transmitting plate 57 are bonded is disposed in the panel housing portion 66 formed inside of the frame 60, the heat radiation member 70 is disposed on the other side Z2 of the Z-axis direction of the electro-optical panel 40. Then, the frame portion 71 is placed between the end portion 561 of the first light transmitting plate 56 and a plate-like portion 619 provided in the frame portion 61 of the frame 60, and overlaps the second surface 51b of the first substrate 51 in a state of having contact with the side where the end portion 511 is positioned. The frame portion 72 is placed between the end portion 562 of the first light transmitting plate 56 and a plate-like portion 629 provided in the frame portion 62 of the frame 60, and overlaps the second surface 51b of the first substrate 51 in a state of having contact with the side where the end portion 512 is positioned. Furthermore, the frame portion 73 overlaps the frame portion 63 of the frame 60, and overlaps the second surface 51b of the first substrate 51 in a state of having contact with the side where the end portion 513 is positioned. The frame portion 74 overlaps the frame portion 64 of the frame 60, and overlaps the second surface 51b of the first substrate 51 in a state of having contact with the side where the end portion 514 is positioned. Accordingly, when the heat radiation member 70 and the frame 60 are fixed by an adhesive 79, and the electro-optical panel 40 is held by the heat radiation member 70 and the frame 60, heat generated from the electro-optical panel 40 is allowed to escape through the first substrate 51 and the frame portions 71, 72, 73 and 74 of the heat radiation member 70.

When the heat radiation member 70 is disposed on the other side Z2 of the Z-axis direction of the electro-optical panel 40, an inner peripheral thin plate portion 77 of the heat radiation member 70 overlaps a surface of the other side Z2 of the Z-axis direction in the entire periphery of the first light transmitting plate 56, and functions as a parting. The thickness dimension of the inner peripheral thin plate portion 77 is considerably smaller than the thickness dimension (dimension in the Z-axis direction) of the rectangular frame part 76 and the dimensions (dimension in the Z-axis directions) of the outer peripheral thin plate portions 711 and 721. For example, the thickness dimension of the inner peripheral thin plate portion 77 is equal to or more than 0.2 mm. Therefore, as indicated by the arrow A, when the flow of cooling air is formed by the intake fan 15B shown in FIG. 1B or the like along a surface of the electro-optical panel 40 on the other side Z2 of the Z-axis direction, the cooling air smoothly enters the opening portion 78 of the heat radiation member 70 (opening portion 78 of the inner peripheral thin plate portion 77 (parting)), and flows from the other side Y2 of the Y-axis direction to one side Y1. Thus, the heat generated from the electro-optical panel 40 is allowed to escape to the cooling air through the first light transmitting plate 56.

Plural concave portions 747 are formed in the end portion positioned in one side Y1 of the Y-axis direction on an outer surface of the frame portion 74 positioned on one side Y1 of the Y-axis direction (surface of the other side Z2 of the Z-axis direction) of the heat radiation member 70. The plural concave portions 747 are arranged with a predetermined gap in the X-axis direction. Due to this, when the flow of cooling air is formed along the surface of the electro-optical panel 40 on the other side Z2 of the X-axis direction, the concave portions 747 and convex portions between the concave portions 747 function as a heat radiation fin. Therefore, when the heat generated from the electro-optical panel 40 escapes through the heat radiation member 70, the heat is allowed to effectively escape to cooling air from the frame portion 74.

Bonding Structure of Heat Radiation Member 70 and Frame 60

When the electro-optical module 10 of the embodiment is manufactured, after the parting member 80 is attached to the frame 60 and the panel housing portion 66 is formed inside of the frame 60, the electro-optical panel 40 to which the first light transmitting plate 56 and the second light transmitting plate 57 are bonded is accommodated in the panel housing portion 66. Then, the second light transmitting plate 57 comes into close contact with the bottom portion of the panel housing portion 66 (end plate portion 87 of the parting member 80). In this state, since a gap is formed between the frame 60 and the heat radiation member 70, the heat-curable or anaerobic adhesive 79 is applied to the frame 60 or the heat radiation member 70 to cure the adhesive. Then, the frame 60 and the heat radiation member 70 can be fixed by the adhesive 79, and a state in which the electro-optical panel 40 is held by the panel housing portion 66 is consequentially made.

When the frame 60 and the heat radiation member 70 are fixed by the adhesive 79, as shown in FIGS. 8B and 9, the following places of the frame portion 61 in the frame 60 and the frame portion 71 of the heat radiation member 70 are used in bonding. First, on the inside surface of the frame portion 61 of the frame 60 (side surface of the panel housing portion 66), the step portion 61c has a surface 618 which faces the frame portion 71 of the heat radiation member 70 with a gap in the Z-axis direction and a surface 619a (inside surface of the plate-like portion 619) which faces the outside surface of the frame portion 71 in the heat radiation member 70 with a gap in the other side X2 of the X-axis direction. Therefore, for example, after the adhesive 79 is applied to the step portion 61c, the surface 618 is used as a first bonding surface of the heat radiation member 70, and the surface 619a is used as a second bonding surface of the heat radiation member 70. A surface 619b of the plate-like portion 619 (tip surface of the plate-like portion 619) in the frame 60 on the other side Z2 of the Z-axis direction faces the outer peripheral thin plate portion 711 of the heat radiation member 70 in the Z-axis direction, and the surface 619b is use as a third bonding surface of the heat radiation member 70.

As shown in FIG. 8B, the same configuration is provided between the frame portion 62 of the frame 60 and the frame portion 72 of the heat radiation member 70 and the frame portion 61 of the frame 60 and the frame portion 71 of the heat radiation member 70. Accordingly, after the adhesive 79 is applied to the step portion 62c, a surface 628 which faces the frame portion 72 of the heat radiation member 70 with a gap in the Z-axis direction is used as a first bonding surface of the heat radiation member 70, and a surface (inside surface of the plate-like portion 629) which faces an outside surface of the frame portion 72 in the heat radiation member 70 in one side X1 of the X-axis direction is used as a second bonding surface of the heat radiation member 70. In the plate-like portion 629 of the frame 60, a surface which faces the outer peripheral thin plate portion 721 of the heat radiation member 70 in the Z-axis direction is used as a third bonding surface of the heat radiation member 70.

As shown in FIG. 8A, the frame portion 63 of the frame 60 and the frame portion 73 of the heat radiation member 70 face each other with a gap in the Z-axis direction. Accordingly, a surface 638 of the frame portion 63 which faces the frame portion 73 in the Z-axis direction is also used as a bonding surface by the adhesive 79.

When the frame 60 and the heat radiation member 70 are fixed by the adhesive 79, the applied adhesive tries to leak out. Even in this case, the plate-like portion 619 erects on the outer side of the surface 618 of the frame portion 61 and the plate-like portion 629 erects on the outer side of the surface 628 of the frame portion 62. Due to this, when the adhesive spreads from the surfaces 618 and 628, the leakage of the adhesive 79 to the outside is prevented by a narrow gap between the inside surface of the plate-like portion 619 and the outside surface of the frame portion 71 in the heat radiation member 70 and a narrow gap between the inside surface of the plate-like portion 629 and the outside surface of the frame portion 72 in the heat radiation member 70. Furthermore, since the plate-like portion 619 and the outer peripheral thin plate portion 711 face each other in the Z-axis direction on the outer side from the gap between the inside surface of the plate-like portion 619 in the frame 60 and the outside surface of the frame portion 71 in the heat radiation member 70 and the plate-like portion 629 and the outer peripheral thin plate portion 721 face each other on the outer side from the gap between the inside surface of the plate-like portion 629 in the frame 60 and the outside surface of the frame portion 72 in the heat radiation member 70, the leakage of the adhesive 79 to the outside is prevented. Therefore, the adhesive 79 does not leak outside the frame 60.

Although the applied adhesive 79 tries to spread around the surface 638 of the frame portion 63, the width dimension of the surface 638 in the X-axis direction is considerably large. Therefore, when the adhesive 79 is applied along the inner edge of the surface 638, since the distance to which the adhesive 79 leaks outside the frame 60 is large, the adhesive 79 applied to the surface 638 does not leak outside the frame 60.

When the heat radiation member 70 and the frame 60 are bonded by the adhesive 79, as indicated by the two-dot chain line in FIG. 5, until the adhesive 79 is cured by the plate-like temporarily fastening tool 90, the heat radiation member 70 and the frame 60 are held. The bonding process of the heat radiation member 70 and the frame 60 can be easily performed. The temporarily fastening tool 90 includes an end plate portion 95 which overlaps the heat radiation member 70 in the other side Z2 of the Z-axis direction and a side plate portion 91 which is bent from both ends of the end plate portion 95 in the X-axis direction to one side Z1 of the Z-axis direction, and an engaging hole 910 which fits the protrusion portion 69 of the frame 60 is formed in the side plate portion 91. Due to this, the temporary fastening tool 90 is disposed so that the end plate portion 95 covers the heat radiation member 70, and when the engaging hole 910 of the side plate portion 91 fits the protrusion portion 69, the heat radiation member 70 and the frame 60 can be temporarily fastened. The temporary fastening tool 90 can be easily removed just by removing the engaging hole 910 of the side plate portion 91 from the protrusion portion 69.

Main Effect of Embodiment

As described above, since the first light transmitting plate 56 is provided on the second surface 51b of the first substrate 51 (opposite surface of the second substrate 52) in the electro-optical module 10 of the embodiment so as to overlap the image display region 40a, dust does not attach to the position close to the electro-optical material layer 450 (liquid crystal layer) (first substrate 51). Therefore, even when an image generated from the electro-optical panel 40 is projected, it is difficult for the image to be affected by the dust.

The first light transmitting plate 56 is provided so as to partially expose the second surface 51b of the first substrate 51, and the heat radiation member 70 which is made of a material with higher thermal conductivity than that of first light transmitting plate 56 is provided so as to overlap the first substrate 51 in a state of having contact with at least a part of the exposed part from the first light transmitting plate 56 of the first substrate 51. For this reason, heat generated from the electro-optical panel 40 is allowed to effectively escape through the heat radiation member 70. Accordingly, display quality deterioration caused by the temperature increase of the electro-optical panel 40 can be suppressed. The heat radiation member 70 is made of metal, and has a higher thermal conductivity than the first light transmitting plate 56 (quartz glass). Therefore, heat generated from the electro-optical panel 40 is allowed to effectively escape through the heat radiation member 70.

The first light transmitting plate 56 is smaller than the first substrate 51 in size, and the end portions 561, 562, 563 and 564 of the first light transmitting plate 56 are overlapped between the end portions 511, 512, 513 and 514 of the first substrate 51 and the end portions of the image display region 40a in the entire periphery of the first light transmitting plate 56. The rectangular frame part 76 of the heat radiation member 70 is provided to surround the entire periphery of the first light transmitting plate 56. Due to this, since the area in which the exposed part from the first light transmitting plate 56 of the first substrate 51 and the heat radiation member 70 overlap each other is large, heat generated from the electro-optical panel 40 is allowed to effectively escape through the heat radiation member 70. Furthermore, since the quartz glass substrate which is smaller than the first substrate 51 in size is used for the first light transmitting plate 56, it is possible to reduce cost of the first light transmitting plate 56.

In the embodiment, since the heat radiation member 70 is a forged product made of aluminum, the inner peripheral thin plate portion 77 which forms the emitting side parting portion can be thinly formed unlike casting products or the like. More specifically, in case of a forging product, it is possible to thinly form the inner peripheral thin plate portion 77 to have a thickness equal to or less than 0.2 mm. However, in case of a casting product, there is a limit for making the inner peripheral thin plate portion 77 thinness of 0.3 mm. For this reason, in the embodiment, as indicated by the arrow A, when the flow of cooling air is formed by the intake fan 15B shown in FIG. 1B or the like along the surface of the electro-optical panel 40 on the other side Z2 of the Z-axis direction, the cooling air smoothly enters the opening portion 78 of the heat radiation member 70 (opening portion 78 of the inner peripheral thin plate portion 77 (parting)), and flows from the other side Y2 of the Y-axis direction to one side Y1. Thus, it is possible for heat generated from the electro-optical panel 40 to escape to cooling air through first light transmitting plate 56. Since the cooling air smoothly enters the opening portion 78 of the heat radiation member 70, it is possible to prevent dust from attaching to the first light transmitting plate 56, which is advantageous. On the other hand, it is difficult to sufficiently obtain the above effect because there is limitation in thinning and the inner peripheral thin plate portion 77 has a thickness of 0.3 mm or more in case of a casting product.

When the heat radiation member 70 is manufactured by forging, the plural concave portions 747 functioning as a heat radiation fin can be easily formed. Thus, heat generated from the electro-optical panel 40 is allowed to escape to cooling air through the first light transmitting plate 56 according to the embodiment.

The facing end portions of the first light transmitting plate 56 and the heat radiation member 70 are separated from each other. More specifically, the end portions 561, 562, 563 and 564 of the first light transmitting plate 56 and the rectangular frame part 76 (frame portions 71, 72, 73 and 74) of the heat radiation member 70 are separated. For this reason, even when the temperature is decreased and the heat radiation member 70 shrinks, since the heat radiation member 70 does not add a large load to the first light transmitting plate 56, stress from the first light transmitting plate 56 is added to the electro-optical panel 40, and it is possible to avoid the transformation of the electro-optical panel 40.

Furthermore, the heat radiation member 70 overlaps the exposed part of the first substrate 51 which is an element substrate including the pixel electrodes and the switching elements in the first substrate 51 and the second substrate 52. Due to this, when the electro-optical panel 40 transmits light, more heat is generated from the first substrate 51 than from the second substrate 52. However, in the embodiment, since the heat radiation member 70 overlaps the exposed part of the element substrate (first substrate 51) with more heat generation, the heat generated from the electro-optical panel 40 is allowed to effectively escape.

In the embodiment, the step portions 61b and 61c are formed on the side surface of the panel housing portion 66 (inner surface of the frame 60). The surfaces 618 and 628 which face the heat radiation member 70 with a gap in the Z-axis direction are used as the first bonding surfaces with the heat radiation member 70, surfaces which face the heat radiation member 70 in the X-axis direction (inner surfaces of the plate-like portion 619 and 629) are used as second bonding surfaces with the heat radiation member 70. Therefore, since a gap between the heat radiation member 70 and the first bonding surface, and a gap between the side surface of the heat radiation member 70 and the second bonding surface are interposed between the inside of the frame 60 and the outer side, it is difficult for the adhesive 79 to leak outside the frame 60. Since the heat radiation member 70 and the frame 60 are bonded over a wide area, bonding strength between the heat radiation member 70 and the frame 60 is large.

Furthermore, since the frame 60 includes the third bonding surfaces (tip surfaces of the plate-like portions 619 and 629) which face the heat radiation member 70 in the Z-axis direction on the outer side from the second bonding surface, the heat radiation member 70 and the frame 60 are bonded over a wide area. Accordingly, the bonding strength of the heat radiation member 70 and the frame 60 is large. Since the gap between the heat radiation member 70 and the first bonding surface, the gap between the heat radiation member 70 and the second bonding surface, and a gap between the heat radiation member 70 and the third bonding surface are interposed between the inside of the frame 60 and the outer side, the adhesive 79 is more difficult to leak outside the frame 60, which is advantageous.

Other Embodiment of Electro-Optical Module

In the above embodiment, the electro-optical module 10 which includes the transmission type electro-optical panel 40 is exemplified, but the invention may be applied to the electro-optical module 10 which includes the reflection type electro-optical panel 40.

In the above embodiment, the front projection type display device which projects a projection image from an observation direction is exemplified as a projection type display device, but the invention may be applied to a rear projection type display device which projects a projection image from the opposite direction of the observation direction.

In the above embodiment, the liquid crystal panel is exemplified as an electro-optical panel, but the invention is not limited to this. The invention may be applied to electro-optical modules using a panel for organic electroluminescence display, a plasma display panel, a Field Emission Display (FED) panel, a Surface-Conduction Electron-Emitter Display (SED) panel, a light emitting diode (LED) display panel, an electrophoresis display panel, and the like.

Other Electronic Apparatus

The electro-optical module to which the invention is applied may be used in electronic apparatuses such as a mobile phone, a portable information terminal (PDA: Personal Digital Assistants), a digital camera, a liquid crystal television, a car navigation device, a video phone, a POS terminal, and a touch panel, in addition to the above-described electronic apparatus (projection type display device).

This application claims priority from Japanese Patent Application No. 2011-214089 filed in the Japanese Patent Office on Sep. 29, 2011, the entire disclosure of which is hereby incorporated by reference in its entirely.

What is claimed is:

1. An electro-optical module comprising:
an electro-optical panel that has a first surface and a second surface, the second surface being a surface opposite to the first surface;
a frame which holds the first surface of the electro-optical panel, the frame having a frame portion that is positioned around a side surface of the electro-optical panel; and
a heat radiation member which holds the second surface of the electro-optical panel and is disposed so as not to overlap an image display region of the electro-optical panel,
wherein the heat radiation member is bonded to the frame portion adjacent to a plurality of end portions of the electro-optical panel such that, for at least one of the plurality of end portions of the electro-optical panel, the heat radiation member is bonded to a first bonding surface of the frame portion which faces a second bonding surface of the heat radiation member by an adhesive inside a gap between the first bonding surface and the second bonding surface, and a third bonding surface which faces a fourth bonding surface of the heat radiation member by an adhesive inside a gap between the third bonding surface and the fourth bonding surface, the first bonding surface and the third bonding surface of the frame portion being adjacent to each other and facing in different directions, the second bonding surface and the fourth bonding surface of the heat radiation member being adjacent to each other and facing in different directions.

2. The electro-optical module according to claim 1, wherein the heat radiation member is made of metal.

3. The electro-optical module according to claim 1, wherein the frame portion has a fifth bonding surface that is positioned at an outside to the first bonding surface and the third bonding surface,
the heat radiation member has a sixth bonding surface that is positioned at an outside to the second bonding surface and the fourth bonding surface, and
the heat radiation member is bonded to a fifth bonding surface of the frame portion which faces the sixth bonding surface of the heat radiation member by an adhesive inside a gap between the fifth bonding surface and the sixth bonding surface.

4. The electro-optical module according to claim 1, wherein the electro-optical panel includes a first substrate, a second substrate which is disposed to face the first substrate of an opposite side of a side on which the heat radiation member is positioned and an electro-optical material layer which is provided between the first substrate and the second substrate, and
the second surface of the electro-optical panel is a surface of the first substrate opposite to the second substrate.

5. The electro-optical module according to claim 4, further comprising a first light transmitting plate which is disposed to face the first substrate of an opposite side of a side on which the second substrate is positioned,
the first light transmitting plate overlaps at least the image display region, and
the first light transmitting plate is partially overlapped with the first substrate,
wherein the second surface is a portion of the first substrate not overlapped with the first light transmitting plate.

6. The electro-optical module according to claim 5, wherein overlapped portions of the first substrate and the first light transmitting plate are surrounded by the second surface in plan view.

7. The electro-optical module according to claim 5, wherein the heat radiation member includes a plate-like part which overlaps not the image display region but the first light transmitting plate on the opposite side of the electro-optical panel.

8. The electro-optical module according to claim 7, wherein the plate-like part forms a parting portion.

9. The electro-optical module according to claim 5, wherein the end portions of the first light transmitting plate and the heat radiation member which face each other are separated from each other.

10. The electro-optical module according to claim 4, further comprising a second light transmitting plate which overlaps at least the image display region in a state in which a surface of the second substrate opposite to the first substrate is partially exposed.

11. The electro-optical module according to claim 4, wherein the first substrate is an element substrate which includes a pixel electrode and a switching element provided to correspond to the pixel electrode.

12. The electro-optical module according to claim 1, wherein the electro-optical panel is a liquid crystal panel including a liquid crystal layer as the electro-optical material layer.

13. An electronic apparatus which includes the electro-optical module according to claim 1, comprising:
a light source unit which emits light supplied to the electro-optical module; and
a projecting optical system which projects light modulated by the electro-optical module.

14. An optical unit comprising,
a plurality of the electro-optical modules according to claim 1,
a light-combining optical system that emits light generated by combining light beams emitted from the plurality of the electro-optical modules.

15. The electro-optical module according to claim 1, wherein the heat radiation member includes an outer peripheral thin plate portion that outwardly protrudes from an outer edge of a rectangular frame part of the heat radiation member, and
the heat radiation member is bonded to a fifth bonding surface of the frame portion which faces a sixth bonding surface of the outer peripheral thin plate portion of the heat radiation member by an adhesive inside a gap between the fifth bonding surface and the sixth bonding surface.

16. The electro-optical module according to claim 1, wherein the heat radiation member includes a plurality of concave portions, and a plurality of convex portions between the concave portions, at an end portion of the heat radiation member that is most downstream from the flow of cooling air directed over the electro-optical module.

17. The electro-optical module according to claim 1, wherein the first bonding surface of the frame portion is substantially perpendicular to the third bonding surface of the frame portion.

18. An electro-optical module comprising:
an electro-optical panel that has a first surface and a second surface, the second surface being a surface opposite to the first surface;
a frame which contacts the first surface of the electro-optical panel, the frame having a frame portion that is positioned around a side surface of the electro-optical panel; and
a heat radiation member which contacts the second surface of the electro-optical panel and is disposed so as not to overlap an image display region of the electro-optical panel,
wherein the heat radiation member is bonded to the frame portion adjacent to a plurality of end portions of the electro-optical panel such that, for at least one of the plurality of end portions of the electro-optical panel, the heat radiation member is bonded to a first bonding surface of the frame portion which faces a second bonding surface of the heat radiation member by an adhesive inside a gap between the first bonding surface and the second bonding surface, and a third bonding surface which faces a fourth bonding surface of the heat radiation member by an adhesive inside a gap between the third bonding surface and the fourth bonding surface, the first bonding surface and the third bonding surface of the frame portion being adjacent to each other and facing in different directions, the second bonding surface and the fourth bonding surface of the heat radiation member being adjacent to each other and facing in different directions.

* * * * *